United States Patent
Wessels et al.

(10) Patent No.: US 11,054,256 B2
(45) Date of Patent: Jul. 6, 2021

(54) ROAD MONITORING METHOD AND SYSTEM

(71) Applicant: TRACKER CONNECT (PTY) LIMITED, Johannesburg (ZA)

(72) Inventors: Illezé Wessels, Pretoria (ZA); Carel Lourens Wessels, Pretoria (ZA); Wynand Jacobus Van Der Merwe Steyn, Pretoria (ZA)

(73) Assignee: TRACKER CONNECT (PTY) LIMITED, Johannesburg (ZA)

( * ) Notice: Subject to any disclaimer, the term of this patent is extended or adjusted under 35 U.S.C. 154(b) by 272 days.

(21) Appl. No.: 16/079,037

(22) PCT Filed: Feb. 22, 2017

(86) PCT No.: PCT/IB2017/051008
§ 371 (c)(1),
(2) Date: Aug. 22, 2018

(87) PCT Pub. No.: WO2017/145069
PCT Pub. Date: Aug. 31, 2017

(65) Prior Publication Data
US 2019/0056224 A1 Feb. 21, 2019

(30) Foreign Application Priority Data
Feb. 22, 2016 (ZA) .................. 2016/01207

(51) Int. Cl.
*G01C 7/04* (2006.01)
*E01C 23/01* (2006.01)
(Continued)

(52) U.S. Cl.
CPC ............ *G01C 7/04* (2013.01); *B60W 40/06* (2013.01); *E01C 23/01* (2013.01); *G01B 21/30* (2013.01)

(58) Field of Classification Search
CPC ....................................................... G01C 7/04
(Continued)

(56) References Cited

U.S. PATENT DOCUMENTS

| | | | | |
|---|---|---|---|---|
| 5,586,028 A | * | 12/1996 | Sekine | B60T 8/174 |
| | | | | 701/1 |
| 6,202,020 B1 | * | 3/2001 | Kyrtsos | B60T 8/172 |
| | | | | 701/37 |

(Continued)

FOREIGN PATENT DOCUMENTS

| | | |
|---|---|---|
| CN | 104120644 | 10/2014 |
| CN | 104792937 A | 7/2015 |

(Continued)

OTHER PUBLICATIONS

Eriksson et al., "The Pothole Patrol: Using a Mobile Sensor Network for Road Surface Monitoring", Proceeding of the Sixth International Conference on Mobile Systems, Applications, and Services: Breckenridge, CO, USA(2008): 29-39.

(Continued)

*Primary Examiner* — Hyun D Park
(74) *Attorney, Agent, or Firm* — Merchant & Gould P.C.

(57) ABSTRACT

A method 20 and system 10 monitor road condition, by providing, for portions (14.1-14.m) of a road 12, an approximation 210 of a roughness figure in accordance with a roughness index. The method 10 includes receiving speed data 208 of a first vehicle 16 travelling along each of the portions of the road 12 and receiving, from a measuring device 18 carried on the first vehicle 16, measured acceleration data 204 of the device 18 perpendicular to the road 12 surface. The acceleration data 204 is processed to provide a parameter value 206 relating to the acceleration data 204 for each of the portions of the road 12. A first speed-based conversion equation and the speed data 208 is utilized to convert the parameter 206 into the approximation 210 of a (Continued)

roughness figure for each of the portions of the road 12, in accordance with the roughness index.

17 Claims, 5 Drawing Sheets

(51) Int. Cl.
    *G01B 21/30*     (2006.01)
    *B60W 40/06*     (2012.01)

(58) Field of Classification Search
    IPC ........................................................ G01C 7/04
    See application file for complete search history.

(56) References Cited

U.S. PATENT DOCUMENTS 6,484,089 B1    11/2002    Millington 8,457,880 B1 *    6/2013    Malalur ................. G06Q 40/08
    701/410
2015/0260614 A1 *    9/2015    Forslof .................. G01B 21/30
    702/182

FOREIGN PATENT DOCUMENTS

| DE | 102014207084 A1 | 10/2015 |
|---|---|---|
| EP | 2687818 A2 | 1/2014 |
| JP | 2015-007341 A | 1/2015 |
| WO | WO 2014/179481 A1 | 11/2014 |

OTHER PUBLICATIONS

International Search Report and Written Opinion for PCT/IB2017/051008, dated Jun. 12, 2017.

Yuchuan Du et al "Measurement of International Roughness Index by using Z-axis accelerometers and GPS", Mathematical Problems in Engineering, Jan. 1, 2014 (2014), 11 pages, XP055611510.

* cited by examiner

ROAD MONITORING METHOD AND SYSTEM

This application is a National Stage application of PCT/IB2017/051008, filed Feb. 22, 2017, which claims benefit of Patent Application No. 2016/01207, filed Feb. 22, 2016 in South Africa, the contents of all of which are hereby incorporated by reference in their entireties. To the extent appropriate, a claim of priority is made to each of the above-disclosed applications.

INTRODUCTION AND BACKGROUND

This invention relates to a method and system for monitoring road condition, including road roughness.

The need to measure road roughness has led to the advent of various measuring devices varying from Response-Type Road Roughness Measurement Systems (RTRRMS) to more sophisticated and dedicated profilometers.

Road roughness is characterised by undulations along the longitudinal axis of the road. Road roughness can be expressed in different measuring standards or roughness indexes, of which the International Roughness Index (IRI) is the international standard. The IRI is a mathematical representation of the accumulated suspension stroke of a vehicle divided by the distance travelled. Consequently, the IRI has a unit of slope. When calculating the IRI, a longitudinal road profile is measured, using a quarter-car simulation. The IRI is a roughness index that is reproducible, portable and constant over time. Another roughness index often used is the Half-Car Roughness Index (HRI) which involves averaging left-hand and right-hand profiles of the vehicle prior to processing the data.

Currently, road roughness measurements are divided into four broad generic classes based on devices and methods of operation, the reproducibility of the measurements and degree of accuracy and precision of the measurements. The main classes of roughness measurements are:

Class 1 which is measured by profilometers configured to measure a road profile with the highest degree of accuracy and precision. Maximum longitudinal sampling interval ≤25 mm. Precision of the vertical elevation measures ≤0.1 mm;

Class 2 which is measured by profilometers that can measure a road profile accurately. Maximum longitudinal sampling interval >25 mm and ≤150 mm. Precision of the vertical elevation measures >0.1 mm and ≤0.2 mm.

Class 3 which is measured by response-type devices which are calibrated by relating the measurements obtained to known IRI figures on particular road sections. Maximum longitudinal sampling interval >150 mm and ≤300 mm. Precision of the vertical elevation measures >0.2 mm and ≤0.5 mm.

Class 4 which is measured by devices that are not calibrated and include subjective ratings of road roughness. The measurements are not suitable for network level surveillance. Maximum longitudinal sampling interval >300 mm. Precision of the vertical elevation measures >0.5 mm.

Class 1 and Class 2 roughness measurements are obtained from very expensive profilometers which provide a detailed indication of road condition. In practice it is not possible or practical to use these profilometers throughout the extended road network on a regular basis to provide accurate measurements of the condition of all the roads in the network.

As an alternative to using profilometers to measure the roughness of all roads within an extended road network, the use of Class 3 type devices to monitor roads, including unpaved roads, on a continuous, real-time basis, by means of devices permanently installed on vehicles using the extended road network has been proposed (in the form of RTRRMS).

The calibration of these devices, and the correlation of the data received through the use thereof to a common scale of interest remain two of the most pressing challenges when using the RTRRMS devices. More specifically, factors that affect the results obtained by these systems, and that continue to pose challenges when calibrating these devices include the suspension system of the host vehicle, vehicle dimensions, a load on the vehicle, type, size and inflation pressure of the tyres used on the vehicle, and the speed at which the vehicle travels during the time of measurement.

OBJECT OF THE INVENTION

It is an object of the present invention to provide a method of and system for providing an indication of the roughness of a portion of a road with which the applicant believes the aforementioned disadvantages may at least be alleviated or which may provide a useful alternative for the known systems and methods.

SUMMARY OF THE INVENTION

According to a first aspect of the invention there is provided a method for providing, for a portion of a road, an approximation of a roughness figure in accordance with a roughness index, the method comprising:
   receiving speed data of a first vehicle travelling along the portion of the road and receiving, from a measuring device carried on the first vehicle, measured acceleration data of the device perpendicular to the road surface;
   processing the acceleration data, to provide a parameter value relating to the acceleration data for the portion of the road; and
   utilising the speed data and a first speed-based conversion equation to convert said parameter into an approximation of a roughness figure for the portion of the road in accordance with the roughness index.

The first speed-based conversion equation may be selected based on the speed data, from a first set of speed-based conversion equations. The first set may comprise a plurality of conversion equations, with each of the conversion equations of the first set relating to a different predetermined speed.

The first speed-based equation may be selectable on the basis of the speed data. In other embodiments the first speed based equation may have as a variable the speed data.

Each speed-based conversion equation of the first set may be pre-derived by:
   utilizing a measured roughness profile in accordance with the roughness index of a reference road section having varying roughness and comprising a plurality of adjacent reference portions, to obtain an actual roughness figure for each reference portion;
   obtaining acceleration data perpendicular to the road section from a first reference measuring device mounted on a first reference vehicle, having been driven along the reference road section at a respective one of the different predetermined speeds, and determining a reference parameter value relating to the acceleration data for each adjacent portion of the reference road section; and deriving a relationship between the reference parameter values and the actual roughness figures for all the reference portions.

The first set of speed-based conversion equations may be pre-stored in a memory arrangement and may relate to a first class of vehicle. A plurality of classes of vehicles may be defined while a respective set of speed-based conversion equations may be pre-derived for each class of vehicles defined.

The plurality of classes of vehicles may include at least some of: small hatchbacks, medium hatchbacks, small sedans, medium sedans, sports utility vehicles (SUVs), minibuses, and pick-up trucks.

The measuring device may be mounted fast on the vehicle, may move in sympathy with the vehicle and may be a vehicle telematics device concealed by the body of the vehicle. The vehicle telematics device may comprise a three-axis accelerometer, three-axis gyroscope, Global Positioning System (GPS) that measures latitude, longitude and speed data of the telematics device, a local controller with an associated memory arrangement and a radio frequency (RF) transceiver enabling wireless data communications between the device and a central backend.

The acceleration data and speed data may be transmitted periodically via the transceiver to the central backend, to be processed.

The roughness index may be one of International Roughness Index (IRI) and Half Car Index (HRI).

The parameter value may be a statistical parameter value obtained by processing the z-axis acceleration data statistically and may be a Coefficient of Variation (CoV) which is defined as a ratio between the standard deviation ($\sigma$) and the mean ($\mu$) of the acceleration data received for the portion of the road.

Alternatively, the parameter value may be a mathematical parameter value.

The local controller of the telematics device may be utilised to process the acceleration data to provide the parameter value. Parameter values of adjacent portions may be transmitted periodically via the RF transceiver to the central backend to be converted into the approximation of the roughness figure in accordance with the roughness index and combined to generate an approximated roughness profile of the road section in accordance with the roughness index. The profile may be distributed to a user in the form of a visual representation which may comprise a map representing road roughness in accordance with a predetermined key.

The acceleration data may be sampled by the measuring device at a rate from 80 Hz to 800 Hz while the length of the portion of the road may be from 1 m to 100 m.

According to a second aspect of the invention there is provided a system which may be used for providing, for a portion of a road, an approximation of a roughness figure in accordance with a roughness index, the system comprising:
  a central backend;
  a fleet of vehicles each comprising: a measuring device for measuring acceleration data perpendicular to the portion of the road and for providing speed data of the vehicle along the portion of the road; and having a radio frequency (RF) transmitting device for communicating with the central backend;
  a processor for processing the acceleration data measured by the measuring device into a parameter value; and
  a memory arrangement comprising a first speed-based conversion equation used to convert the parameter value into an approximation of a roughness figure in accordance with the roughness index;

The measuring device may be a vehicle telematics device comprising the controller and the memory arrangement. Alternatively, the backend may comprise the memory arrangement.

According to a third aspect of the invention there is provided a computer readable medium with a computer program having a program code for performing the method of claim 1 when the program runs on a processor.

According to a fourth aspect of the invention there is provided computer readable medium having stored thereon data relating to at least a first pre-derived speed-based conversion equation for use by a computer program running on a processor to perform the method of claim 1.

BRIEF DESCRIPTION OF THE ACCOMPANYING DIAGRAMS

The invention will now further be described, by way of example only, with reference to the accompanying diagrams wherein:

FIG. 2(*b*) is a block diagram illustrating a method of deriving a number of sets of speed-based conversion equations;

DESCRIPTION OF A PREFERRED EMBODIMENT OF THE INVENTION

Figure 1:
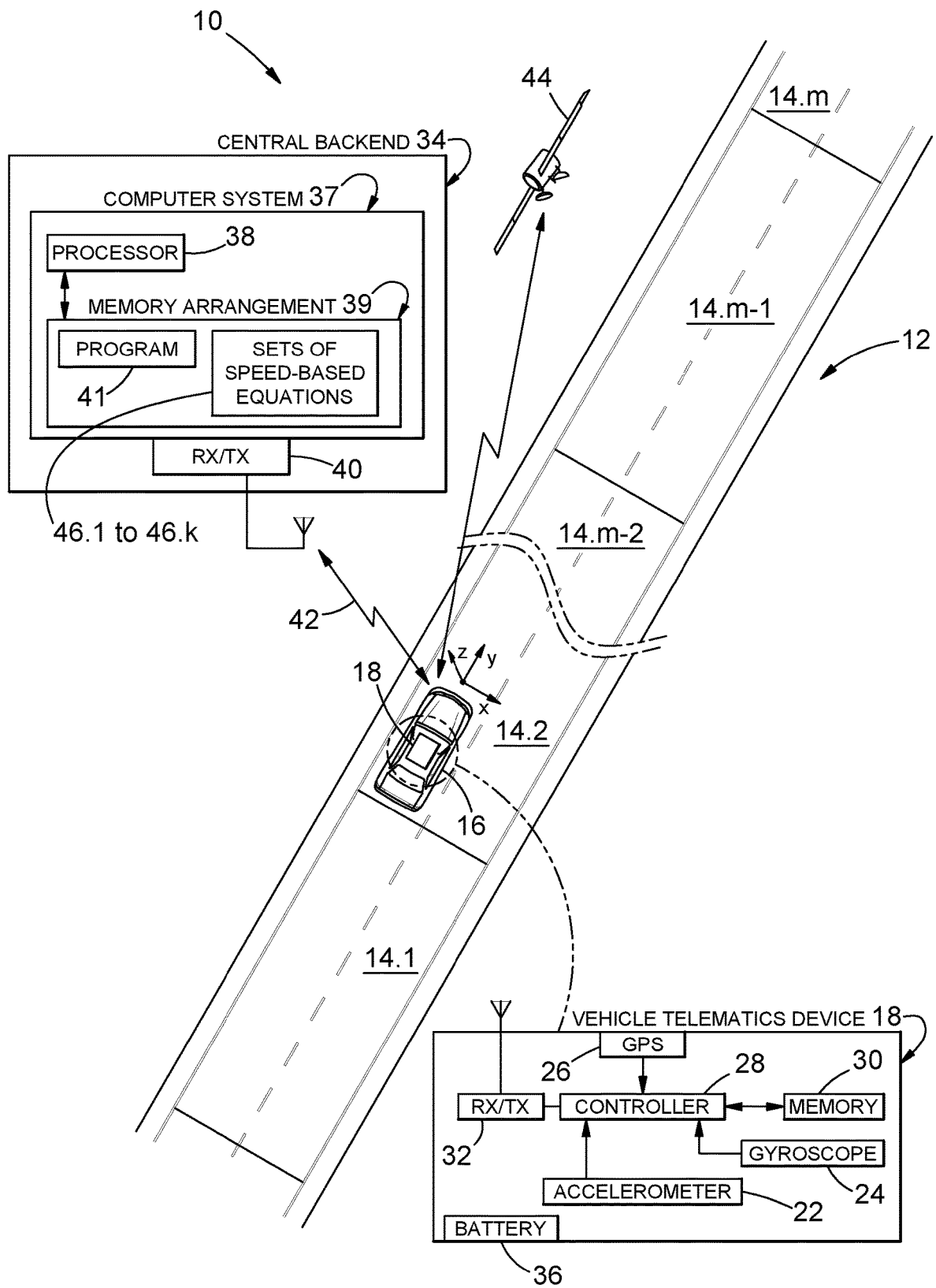
FIG. 1 is a diagrammatic representation of a system for monitoring the condition of roads.

An example embodiment of a system for monitoring the condition of roads is generally designated by the reference numeral 10 in FIG. 1.

A road 12 to be monitored may be any road within a larger road network and is divided into a plurality of adjacent portions (14.1 to 14.*m*), each portion being of equal length, such as 100 m or 10 m for example. The system 10 is utilised to provide, for each of portions 14.1 to 14.*m* of the road 12, an approximation of a roughness figure in accordance with a roughness index. A first vehicle 16, with which x-, y- and z-axes are associated, travels along the road 12. The z-axis is perpendicular to the road surface. While the first vehicle 16 is travelling along the road 12, a first measuring device 18, which is carried by the first vehicle 16, measures and records data in the form of z-axis acceleration of the first device 18. Data relating to the speed at which the first vehicle 16 is travelling along the road 12 is also obtained.

The system 10 is utilised in performing a method for providing, for each of the portions 14.1 to 14.*m* of the road 12, an approximation of a roughness figure in accordance with a roughness index. The method is generally designated by the reference numeral 20 in FIG. 2(*a*).

As the vehicle 16 travels along the road 12, and over the portions 14.1 to 14.*m*, the measuring device 18 measures z-axis acceleration data of the device 18. As stated above, speed data of the vehicle 16 is also obtained. The z-axis acceleration measurement is sampled at a predetermined frequency, so that a plurality of measurements are made in each of the portions 14.1 to 14.*m*. The z-axis acceleration data of each portion is processed to provide a parameter value relating to the z-axis acceleration data measured by the first measuring device 18 while the vehicle was travelling over each respective one of the portions 14.1 to 14.*m* of the road 12.

By utilising the speed data, a first speed-based conversion equation is utilised to convert the parameter value into an approximation of a roughness figure in accordance with the roughness index.

In the example embodiment, the first measuring device 18 is a vehicle telematics device of a known kind which is used for the recovery of stolen/hijacked vehicles, insurance purposes including monitoring driver behaviour and vehicle fleet monitoring and management. The telematics device 18 is mounted fast to the first vehicle 16 and is concealed by the body of the vehicle 16. The telematics device 18 thus moves in sympathy with the vehicle, which enables it to measure z-axis vibrations and accelerations experienced by the vehicle 16, caused by the roughness of the road. In other embodiments the device may be removable but rigidly connectable to the body or chassis in a cradle or the like. The vehicle telematics device 18 comprises a three-axis accelerometer 22, a three-axis gyroscope 24, a Global Positioning System (GPS) 26, a local controller 28 comprising a processor and an associated memory arrangement 30, a radio frequency (RF) transceiver 32 enabling wireless data communication between the telematics device 18 and a central backend 34 and a local power supply for the device comprising a battery 36.

The location of each portion (14.1 to 14.*m*) of the road 12 is determined by means of the GPS providing longitude and latitude data of the vehicle to an accuracy of approximately 2.5 Circular Error Probability (CEP).

The transceiver 32 periodically transmits data to the backend 34. The frequency at which z-axis acceleration data is measured (the sampling rate) and the capacity of the memory arrangement 30 and processor 28 of the telematics device 18 influence the rate of transmitting data to the backend 34.

In the example embodiment, the backend 34 comprises a computer system 37 comprising processing means 38 and a memory arrangement 39; and a receiver 40 enabling wireless communication between the telematics device 18 and the backend 34. The wireless communication between the telematics device 18 and the backend 34 may be by way of a Global System for Mobile Communication (GSM) network 42. The GPS 26 of the telematics device communicates extra-terrestrially with a satellite 44 in a known manner.

The roughness index in accordance with which the acceleration data is approximated may be one of the International Roughness Index (IRI) and the Half Car Roughness Index (HRI).

Figure 2A:
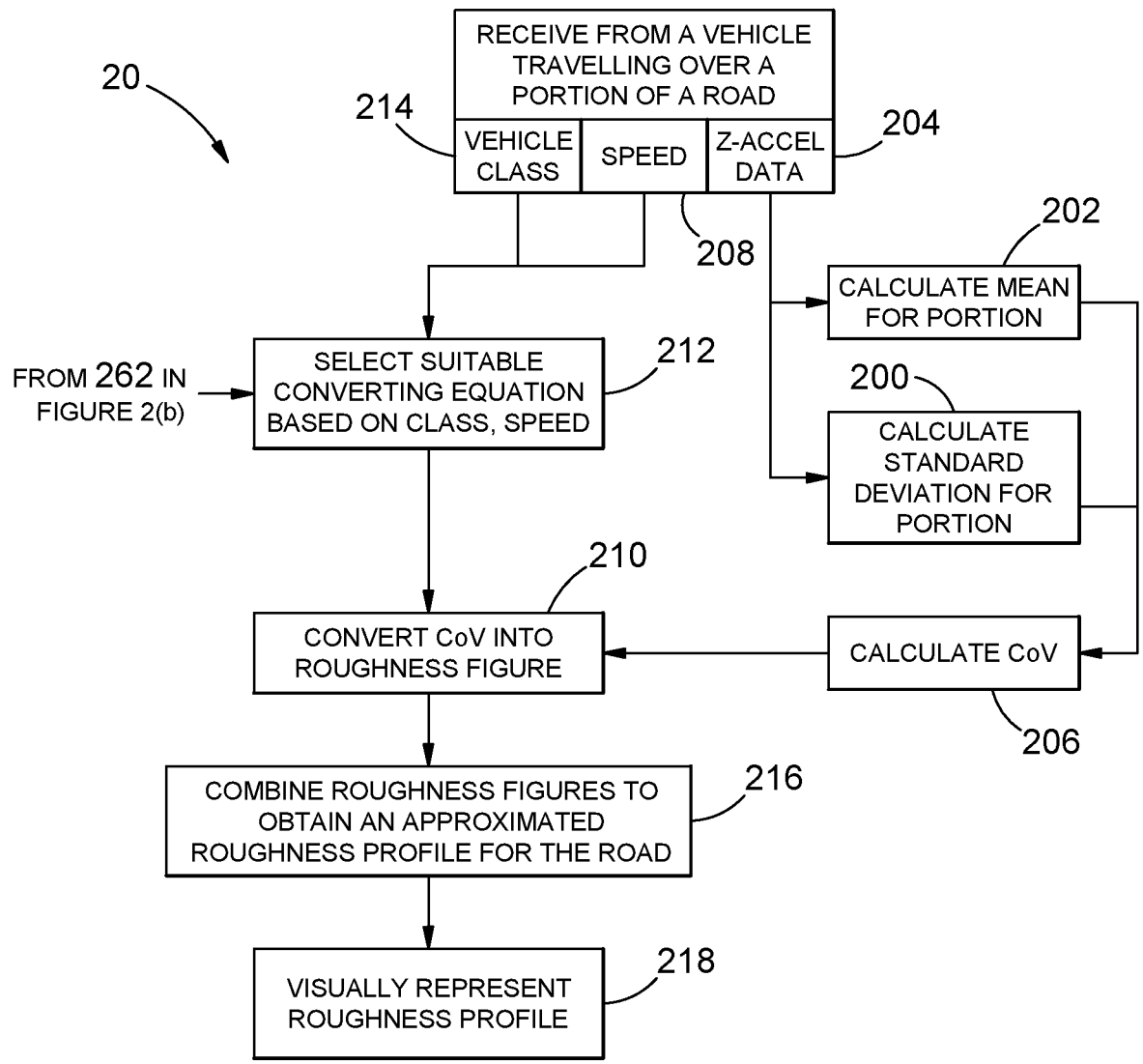
FIG. 2(*a*) is a block diagram illustrating a method for providing, for a portion of a road, an approximation of a roughness figure in accordance with a roughness index such as HRI or IRI.
Figure 2B:
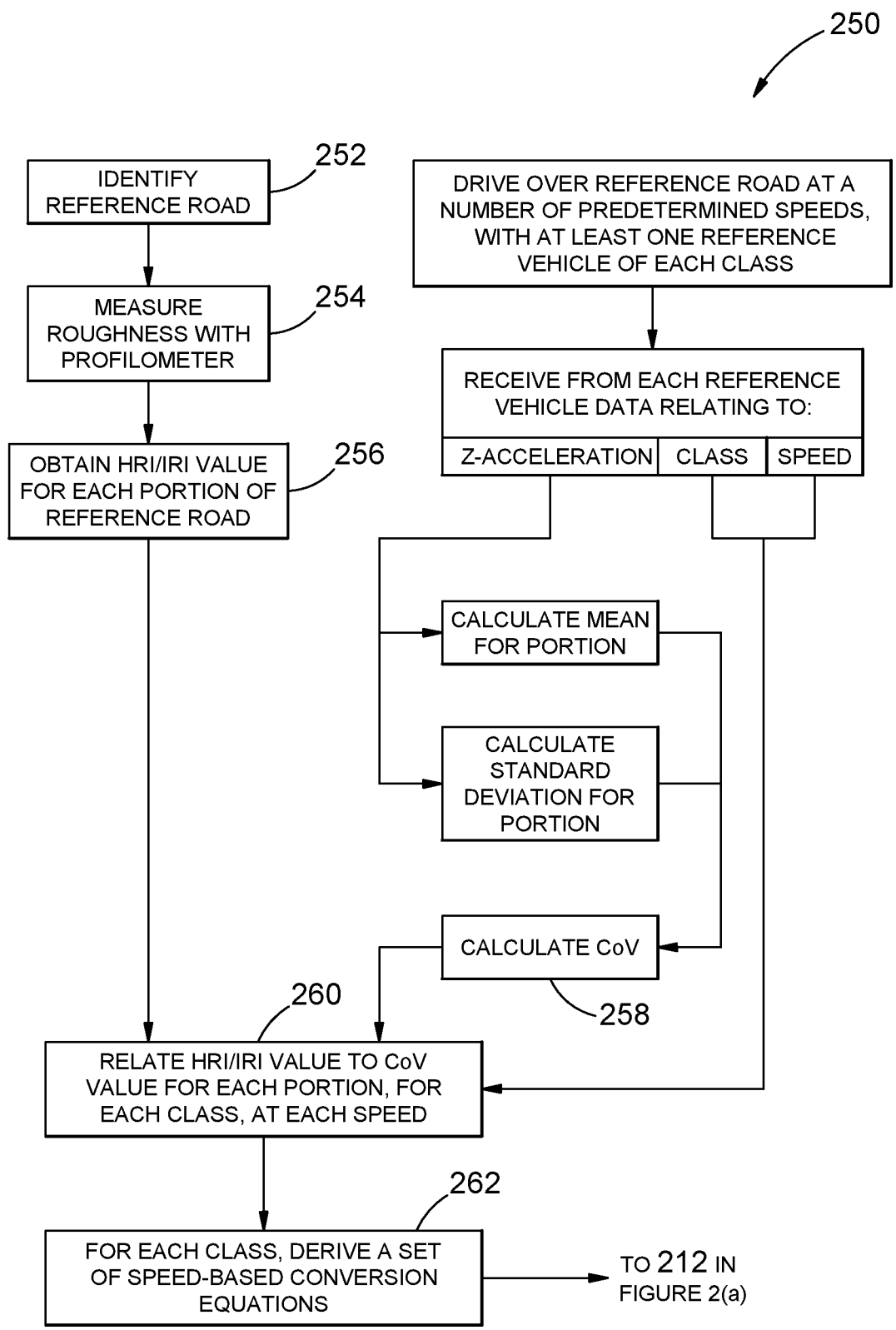

In the example embodiment, and referring also to FIG. 2(*a*), the parameter value is a statistical parameter value and may be obtained by processing the acceleration data of each of the portions 14.1 to 14.*m* of the road 12 statistically, to obtain a Coefficient of Variation (CoV) for the particular portion, relating to z-axis acceleration of the device 18. In determining the CoV, the standard deviation (σ) (shown at 200 in FIG. 2(*a*)) and the mean (μ) (shown at 202 in FIG. 2(*a*)) of the acceleration data received (shown at 204 in FIG. 2(*a*)) for the portion of the road 12 is calculated. The CoV is then obtained at 206 in FIG. 2(*a*) according to the following equation:

$$CoV = \frac{\sigma_{z\text{-}Acceleration}}{\mu_{z\text{-}Acceleration}} \times 100$$

The CoV is a dimensionless quantity of dispersion. It is often used to measure the variability or dispersion of data in relation to the mean of a distribution. It is more simply defined as the ratio of the standard deviation to the mean of the data. The dimensionless property of the CoV allows data from different vehicles or vehicles travelling at different speeds to be compared more readily.

In cases where the available memory arrangement 30 is insufficient, the CoV value may be approximated by making use of a Naïve Coefficient of Variation (NCoV), which is defined as:

$$NCoV = \frac{\text{Running Standard } Deviation_{z\text{-}Acceleration} \text{ (or Naive Deviation)}}{Mean_{z\text{-}acceleration}} \times 100$$

When using the NCoV, the standard deviation as used in the CoV calculation is thus supplanted by a running standard deviation (or naïve deviation) of the z-acceleration data.

Throughout this specification, reference to the CoV is to be interpreted as including as an alternative the use of the NCoV.

As will be explained in more detail below, correlation between the trends of different CoV data plots and an actually measured HRI profile is noticeable when comparing FIGS. 4 and 5. Areas of high CoV values can be associated with areas of high road roughness.

Despite this, the CoV in itself is not suitable to provide a realistic approximation of a roughness figure and requires further processing. This is evident from vertical scatter obtained when plotting CoV graphs of different vehicles driving over a road at different speeds. The data output shown in FIG. 5 can be viewed as a standard first order data set that can be obtained from a cloud of data collected from all the vehicles in a population of vehicles fitted with telematics devices 18.

It is important to note that, when calculating the CoV values, the standard deviation and mean of the z-axis acceleration should always be positive and should not fluctuate around the zero axis. For this reason, the gravity component of the z-axis acceleration is retained during the calculations. Preferably, the sampling rate of the data is 100 Hz while the length of each of the portions 14.1 to 14.*m* of the road 12 is 100 m. At this frequency, and at an example speed of 100 km/h, z-axis acceleration data is sampled every 278 mm along each of the portions 14.1 to 14.*m* of the road 12, which corresponds well to Class 3 roughness measurements. As data storage, processing and transmitting capabilities of the system 10 is improved, the length of the portion can be reduced to 10 m, to improve the accuracy of results obtained thereby. Other sampling rates, such as 80 Hz, are feasible. However, the higher the sampling rate, the more accurate the approximation will be. New generation telematics devices are capable of sampling rates of up to 400 Hz.

A single CoV value, based on all the sampled acceleration data points is therefore determined for each of the portions 14.1 to 14.m of the road 12.

Instead of determining the CoV value as mentioned above, a Root Mean Square (RMS) value may alternatively be determined for each portion 14.1 to 14.m. It has however been found that, particularly at sampling frequencies of about 100 Hz, utilising CoV instead of the RMS results in a stronger correlation to actually measured roughness according to the roughness index (IRI or HRI).

An advantage of the current system relates to the use of easily obtainable z-axis acceleration data, instead of actually measured displacement data (as used by known profilometers), without the need to transform the acceleration data into displacement data. However, should the need arise, the acceleration data could be transformed into displacement data by means of a double integral. Thus, mathematical processing, where the acceleration data is converted to displacement data, may be utilised instead of statistical processing as mentioned above. This inevitably has a negative impact on processing requirements.

The relatively low rate of change of the speed of travel of the vehicle 16, compared to the rate of change of the z-axis acceleration, means that the speed of the vehicle 16 data sampling rate may differ from the z-axis acceleration sampling rate. Typically, speed data (as shown at 208 on FIG. 2(*a*)) is measured at a frequency of 1 Hz, while using linear interpolation to ascribe speed data values for each z-axis acceleration value. The speed data is processed so that a single speed data value is ascribed to each of portions 14.1 to 14.m respectively and thus to each CoV value.

Figure 6:
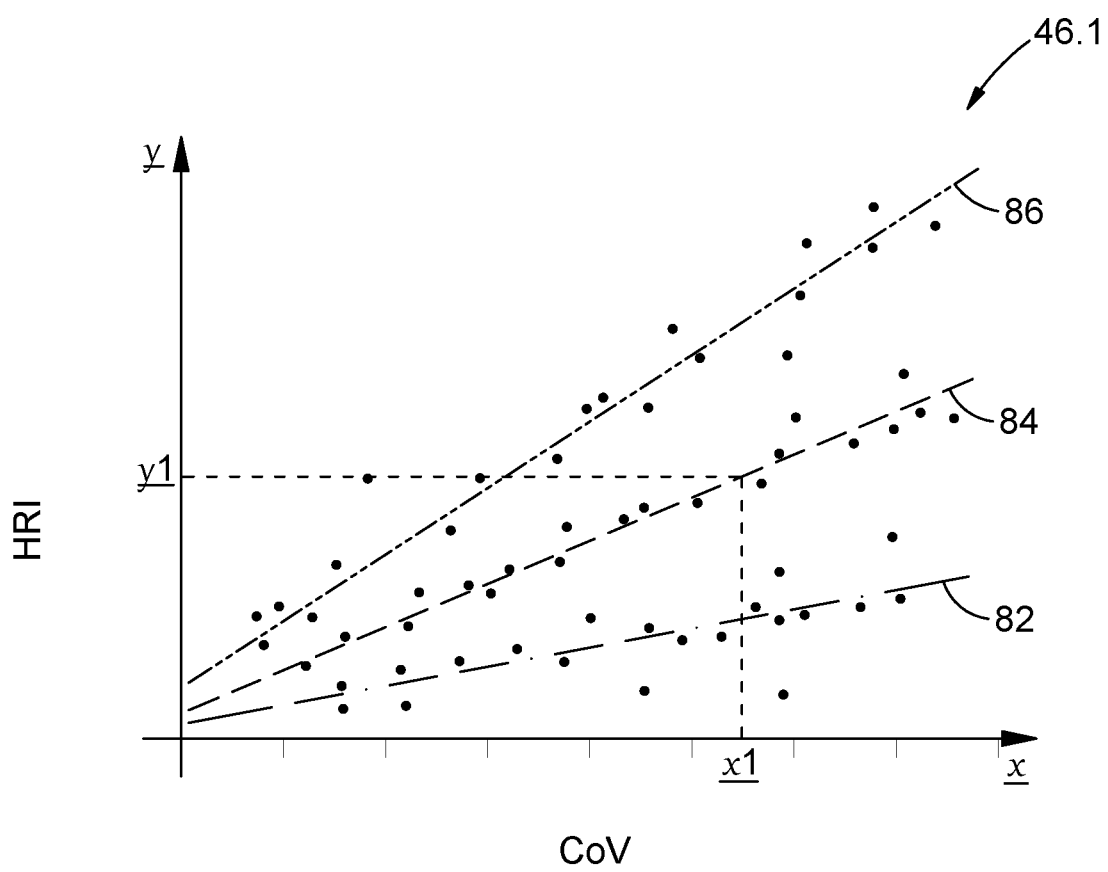
FIG. 6 is a first set of conversion equations, derived from a regression analysis of the data of the FIGS. 4 and 5.

The speed data 208 is used to convert the CoV value 206 into an approximation of roughness figure in accordance with the roughness index (IRI or HRI) for each of portions 14.1 to 14.m. The conversion of the CoV value 206 into the approximation of the roughness figure is shown at 210 in FIG. 2(*a*). This is done by utilising a speed-based conversion equation, depending on the measured speed of the vehicle. A suitable speed-based conversion equation is selected (as shown at 212 in FIG. 2(*a*)) from a first set of pre-derived speed-based conversion equations 80.1 (as shown in FIG. 6). Each conversion equation of the first set 80.1 relates to one of a plurality of different, predetermined speeds. In the example embodiment, the first set of conversion equations 46.1 is stored on the memory arrangement 39 at the back end 34.

Figure 3:
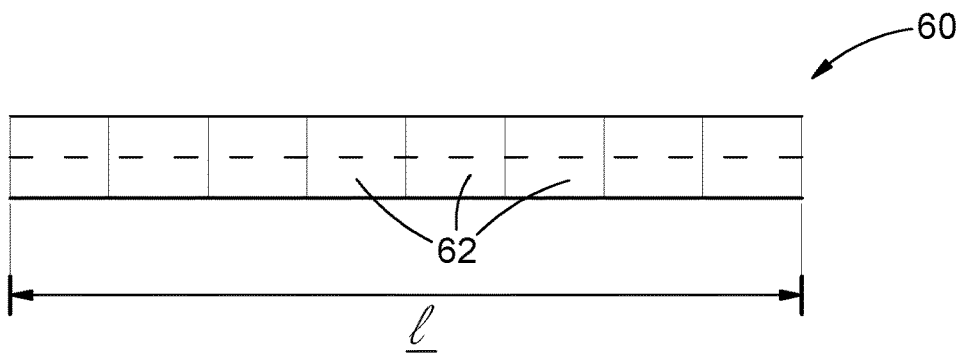
FIG. 3 is a diagrammatic representation of a reference road section comprising a plurality of reference portions, used in the derivation according to the method illustrated in FIG. 2(*b*)

The method of deriving the speed-based conversion equations is generally indicated by reference numeral 250 in FIG. 2(*b*). To derive the conversion equations, a reference road section 60 shown in FIG. 3, is selected (shown at 252 in FIG. 2(*b*)) and divided into a plurality of reference portions 62. The reference road section 60 has a known length l and varying roughness along its length l. The length l of the reference road section 60 must be adequate to provide a wide range of different surface roughnesses. A known profilometer is utilised to measure the actual roughness profile (preferably in accordance with Class 1) of the reference road section 60 in terms of the known roughness index (IRI or HRI) (shown at 254 in FIG. 2(*b*)). FIG. 4 shows an example of an actual roughness profile 64 in terms of the HRI roughness index that was determined by the profilometer for the reference road section 60. From FIG. 4, the actual roughness figure, in terms of the HRI, for each portion 62 of the reference road 60 is thus determinable (shown at 256 in FIG. 2(*b*)).

A first reference vehicle (not shown), which is fitted with a first reference measuring device comprising at least an accelerometer, is driven over the reference road section 60. To derive the speed-based conversion equations for each of the predetermined speeds, the first reference vehicle is driven over the reference road section 60 at each of the speeds.

The z-axis acceleration data obtained from the reference measuring device is processed to obtain the CoV value for each portion 62 of the reference road section 60 (calculation of the CoV for each portion 62 is performed as described above, and is shown at 258 in FIG. 2(*b*)).

Figure 5:
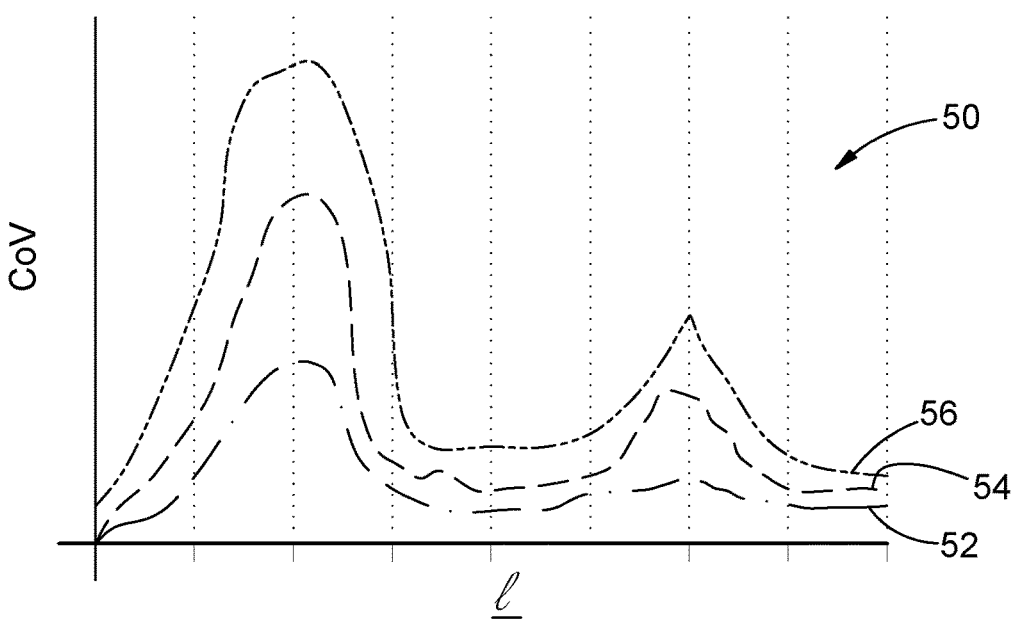
FIG. 5 shows CoV values obtained by a reference vehicle having been driven over the reference road section of FIG. 3 at three different predetermined speeds.

FIG. 5 shows three different profiles in terms of the reference statistical parameter (in this case CoV) obtained from the reference measuring device. By way of example, profiles 52, 54 and 56 refer to instances where the first reference vehicle was travelling along the reference road section 60 at speeds of 40 km/h, 50 km/h and 60 km/h respectively. It will be understood that in practice, many different predetermined speeds will be utilised to derive the conversion equations.

Figure 4:
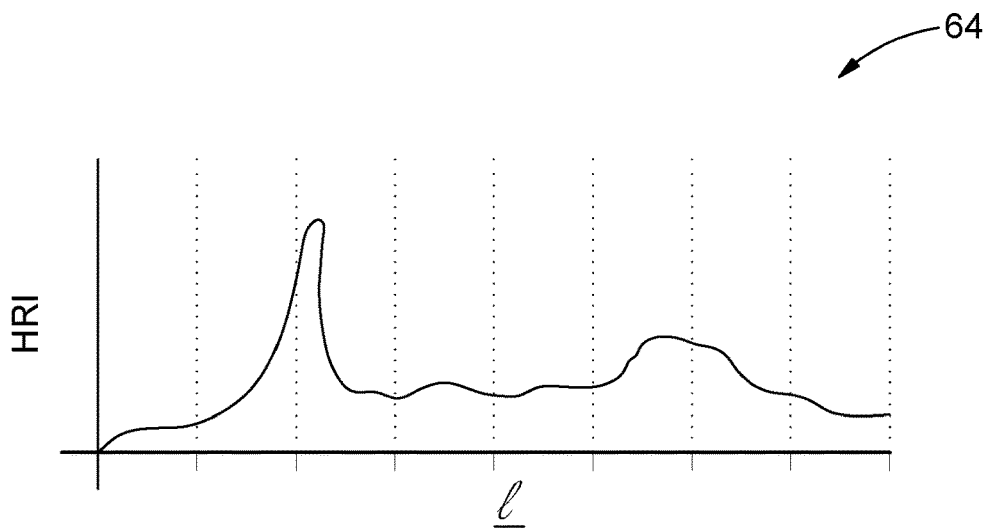
FIG. 4 is an actual roughness profile of the reference road section of FIG. 3, obtained by a Class 1 profilometer.

From a comparison of the actual profile 64 of FIG. 4 and the profiles (52, 54 and 56) of FIG. 5, it is clear that all of the profiles have corresponding shapes. This indicates the strong correlation between the reference CoV values and the actual roughness in accordance with the roughness index. However, the differences in the values of the profiles (52, 54 and 56) of FIG. 5 clearly show the need to correlate the data to a scale of common interest.

For each speed, a relationship is derived by comparing the reference CoV values and the actual roughness figures for each of the reference portions 62 of the reference road 60 (shown at 260 in FIG. 2(*b*)). The derivation of the aforementioned relationship is shown at 262 in FIG. 2(*b*) and the resulting conversion equations are illustrated in FIG. 6. The conversion equations 82, 84 and 86 as shown in FIG. 6 comprise a regression analysis of the reference statistical parameter values and the actual roughness figures for each of the reference portions 62 of the reference road 60. The conversion equations 82, 84 and 86 correspond to the CoV profiles 52, 54 and 56 respectively. Thus each of the conversion equations (82, 84 and 86) corresponds to a specific speed.

FIG. 6 therefore represents an example embodiment of a first set of conversion equations 46.1. Based on the vehicle speed and as shown at 212 in FIG. 2(*a*), a suitable equation is selected from the first set of equations 80.1 and used to convert the parameter relating to acceleration data obtained by any vehicle for any road portion 14.1 to 14.m of a road 12 in a road network to an approximation of a roughness figure in relation to the HRI, as shown at 210 in FIG. 2(*a*).

By way of example only, and referring again to FIG. 1, a vehicle 16 travelling on a road 12 (which does not have to be the reference road 60) at a speed of 50 km/h records acceleration data and speed data over a specific portion 14.2 of the road 12. Processing of the acceleration data statistically for the portion 14.2 results in a CoV value equal to x1. When combining this value with conversion equation 84 (which is selected based on the speed of 50 km/h) an HRI approximation figure y1 is obtained. This procedure is repeated for the acceleration data and speed data of each portion 14.1 to 14.m of the road 12, so that a roughness profile (typically Class 3), approximating a profile measured by a profilometer in terms of the HRI, may be obtained for the road section 12.

No further calibration or normalisation of the approximated data is required as it is already a statistical representation of the road profile. Thus, the converted CoV of the acceleration (z-direction) data may be compared directly to the HRI for the portions of the road sections.

To account for the variations brought about by the suspension type, size, payload etc. of different classes of vehicles, a plurality of reference vehicles are used, to derive a plurality of sets of speed-based conversion equations. The reference vehicles are classified into a number (k) of classes. At least one reference vehicle per class is utilised to derive a set of speed-based-equations relating to that class. There is derived a set of conversion equations for each of the k classes of vehicles, so that there will be k sets of conversion equations, of which set 46.1 is an example.

The classes include, but are not limited to, small hatchbacks, medium hatchbacks, small sedans, medium sedans, small sport utility vehicles (SUVs), large SUVs, small pickup trucks, large pickup trucks etc. Classes may also be defined for commercial vehicles and may specifically be based on the payload of a vehicle. Classification of the vehicles results in more accurate approximations of the roughness figures. The classes may therefore make provision for different makes and models of vehicles.

Thus, when the data is received from the vehicle 16 travelling on the road 12, the class of the vehicle (shown at 214 in FIG. 2(*a*)) will determine which set of conversion equations is utilised, while the speed of the vehicle will determine which specific conversion equation within that set is utilised. The selected equation is then used to convert the CoV value into a roughness index figure (as shown at 210 in FIG. 2(*a*)) as explained above.

If the speed does not correspond directly to one of the equations in the set, either an interpolation or an extrapolation technique may be adopted or used to approximate the figure based on the actual speed.

By utilising the above method, an approximated roughness figure is therefore obtained for each of portions 14.1 to 14.*m* of the road 12. By combining the approximated roughness figures of all adjacent portions 14.1 to 14.*m*, an approximated roughness profile of the road 12 is generated (shown at 216 in FIG. 2(*a*)). When more vehicles of different classes travel along a specific road 12, approximated roughness figures for the sections may be averaged to obtain a more accurate roughness profile for the road section 12. Furthermore, by utilising vehicle telematics devices that are already installed in a large fleet of vehicles, a large portion of roads within a road network can be measured in a cost efficient manner.

The roughness profile can be used to inform road maintenance service providers of areas in need of maintenance. The roughness profiles can also be used to analyse surface deterioration of the roads in the road network so that a preventative maintenance scheme may be implemented. The profiles may further be presented visually (shown at 218 in FIG. 2(*a*)) and distributed to users. This may be particularly useful to persons travelling along roads they are not familiar with, or at night. Road transport service providers may utilise the roughness profiles to select a route that will minimise damage to their vehicles, especially their tyres, and that will minimise maintenance requirements. The information can be displayed on Portable Navigation Devices (PND) as well as on smartphones in terms of a unique application.

The visual representation of the roughness profiles may be in the form of a map showing the extent of road roughness according to a key, typically a colour based key. Alternatively, the roughness profiles may be communicated to a client in the form of a roughness report.

It will be understood that the step of processing the z-axis accelerometer data into a statistical or mathematical parameter value may be performed either by the controller 28 of the telematics device 18, in which case CoV, RMS or displacement data together with speed data will periodically or intermittently be transmitted to the backend 34, or may be undertaken at the backend 34 itself, in which case raw z-axis acceleration data and speed data will periodically or intermittently be transmitted from the telematics device 18 to the backend 34 as specified above. It may also be possible to load onto the memory arrangement 30 of the telematics device 18, the relevant set of conversion equations, so that the steps of processing at 206 the data into a CoV value, selecting at 212 an appropriate conversion equation and converting at 210 the CoV values into an approximated roughness figure in accordance with the roughness index may be undertaken at the telematics device 18. In this instance, only approximated roughness figures for each of the portions 14.1 to 14.*m* will periodically or intermittently be transmitted to the backend 34.

The system 10 therefore provides a cost effective means to monitor the condition of a vast network of roads. Even though the data obtained from the system 10 may be classified as Class 3 roughness measurements, the applicant has found that the correlation between the approximated roughness profiles produced by the system, and an actually measured roughness profile in accordance with the IRI or HRI indexes is strong enough to draw inferences from. The system 10 may be used to provide a first level analysis to prioritise the use of actual profilometers. This may assist in ensuring that agencies without direct access to funding for Class 1 road condition data may be able to obtain an indication of their road network conditions. The system 10 and method 20 herein described and/or defined may also contribute towards the safety and comfort of road users in that the determined estimated road roughness data may be plotted in a mapping application which can be distributed to road users. By utilising the CoV values of z-axis acceleration data and converting the CoV value based on speed and the class of vehicle to obtain an approximation of the roughness of the road, the above disadvantages of current RTRRMS may be overcome or at least alleviated.

For the purpose of calibration, the reference road section 60 must include varying roughness and must be long enough to produce accurate correlations. Furthermore, the variety of classes of vehicles used to derive the different sets of conversion equations must be representative of a large fleet of vehicles generally using the road network. To further improve the accuracy of the conversion equations, more than one reference road may be used (for instance, different reference roads may be used when converting data relating to paved and unpaved roads).

FIG. 1 shows a diagrammatic representation of machines in the exemplary form of a computer system 37 and a vehicle telematics device 18 within which a program code or set of instructions, for causing the machine to perform any one or more of the methodologies discussed herein, may be executed. The machines operate and is capable of executing the set of instructions (sequential or otherwise) that specify actions to be taken by that machine. Further, while only a single machine is illustrated in each case, the term "machine" shall also be taken to include any collection of machines that individually or jointly execute a set (or multiple sets) of instructions to perform any one or more of the methodologies discussed herein.

The exemplary machines 37 and 18 comprise a respective processor (e.g., a central processing unit (CPU) and an associated computer or machine-readable medium in the form of a respective memory arrangement 39 and 30 on which is stored software in the form of one or more sets of instructions 41 and data structures, equations or algorithms 46.1 to 46.$k$ embodying or utilized by any one or more of the methodologies or functions described herein. The software may also reside, completely or at least partially, within the memory and/or within the processor during execution thereof so that the memory and the processor also constituting machine-readable media.

While the machine-readable media 39 and 30 are shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures, equations or algorithms utilized by or associated with such a set of instructions. The term "machine-readable medium" shall accordingly be taken to include, but not be limited to, solid-state memories, optical and magnetic media, and carrier wave signals.

It will be understood that many variations to the disclosures provided herein for the purpose of illustrating or exemplifying the invention are possible without departing from the general spirit of the claimed invention. Such variations are to be interpreted as forming part of the invention. For instance, the sampling rates, reporting frequencies, speeds at which conversion equations are derived, classes of vehicles, lengths of any section or portion etc. are not limited to the examples provided herein. The lengths of the portions may further be changed depending on the client requirements, whereas the sampling rates may increase as telematics technology improves.

The invention claimed is:

1. A method of generating a roughness profile for a road in accordance with a roughness index, the method comprising:

for a portion of the road, providing an approximation of a roughness figure in accordance with the roughness index, by:

receiving speed data of a first vehicle travelling along the portion of the road and receiving, from a measuring device carried on the first vehicle, measured acceleration data of the device perpendicular to the road surface;

processing the acceleration data, to provide a value for a parameter relating to the acceleration data for the portion of the road, the parameter being a statistical parameter obtained by processing the z-axis acceleration data statistically and wherein the statistical parameter is a Coefficient of Variation (CoV) which is defined as a ratio between the standard deviation ($\sigma$) and the mean ($\mu$) of the acceleration data received for the portion of the road; and utilizing the speed data and a first speed-based conversion equation to convert said parameter value into the approximation of the roughness figure for the portion of the road in accordance with the roughness index;

combining the approximation of the roughness figure for the portion of the road with respective approximations of the roughness figure for adjacent portions of the road, to generate the roughness profile for the road; and using the roughness profile to the road to at least one of: inform road maintenance service providers of areas in the road in need of maintenance, enable road transport service providers to select a route to minimize damage to vehicles or to select a different route, and assist road users with a visual representation of the roughness profile.

2. A method according to claim 1, wherein the first speed-based conversion equation is selected based on the speed data, from a first set of speed-based conversion equations comprising a plurality of conversion equations, wherein each of the conversion equations of the first set relates to a different predetermined speed.

3. A method according to claim 2, wherein each speed-based conversion equation of the first set is pre-derived by:

utilizing a measured roughness profile in accordance with the roughness index of a reference road section having varying roughness and comprising a plurality of adjacent reference portions, to obtain an actual roughness figure for each reference portion;

obtaining acceleration data perpendicular to the road section from a first reference measuring device mounted on a first reference vehicle, having been driven along the reference road section at a respective one of the different predetermined speeds, and determining a reference parameter value relating to the acceleration data for each adjacent portion of the reference road section; and deriving a relationship between the reference parameter values and the actual roughness figures for all the reference portions.

4. A method according to claim 2, wherein the first set of speed-based conversion equations relates to a first class of vehicle.

5. A method according to claim 4, wherein a plurality of classes of vehicles are defined and wherein a respective set of speed-based conversion equations is pre-derived for each class of vehicle defined.

6. A method according to claim 5, wherein the plurality of classes of vehicles includes at least some of: small hatchbacks, medium hatchbacks, small sedans, medium sedans, sports utility vehicles (SUVs), minibuses, and pick-up trucks.

7. A method as claimed in claim 5 wherein the respective set of conversion equations is loaded onto a memory arrangement of the measuring device and wherein a local controller of the measuring device selects the first speed-based conversion equation from the respective set of conversion equations and converts the parameter value into the approximation of the roughness figure in accordance with the roughness index.

8. A method according to claim 1, wherein the measuring device is mounted fast on the vehicle, so that the measuring device moves in sympathy with the vehicle.

9. A method according to claim 8, wherein the measuring device is a vehicle telematics device concealed by the body of the vehicle and comprising a three-axis accelerometer, three-axis gyroscope, Global Positioning System (GPS) that measures latitude, longitude and speed data of the telematics device, a local processor with an associated memory arrangement and a radio frequency (RF) transceiver enabling wireless data communications between the device and a central backend.

10. A method according to claim 9, wherein the acceleration data and speed data are transmitted periodically via the transceiver to the central backend, to be processed.

11. A method according to claim 9, wherein the local controller of the telematics device is utilized to process the acceleration data to provide the parameter value, and wherein parameter values of adjacent portions are transmitted periodically via the RF transceiver to the central backend to be converted into the approximation of the roughness figure in accordance with the roughness index.

12. A method according to claim 1, wherein the roughness index is one of International Roughness Index (IRI) and Half Car Index (HRI).

13. A non-transitory computer readable medium with a computer program having a program code for performing the method of claim 1 when the program runs on a processor.

14. A non-transitory computer readable medium having stored thereon data relating to at least a first pre-derived speed-based conversion equation for use by a computer program running on a processor to perform the method of claim 1.

15. A system for generating a roughness profile for a road in accordance with a roughness index, the system comprising:
 a central backend;
 a fleet of vehicles comprising at least a first class of vehicles comprising at least a first vehicle;
 at least the first vehicle comprising: a measuring device configured to measure acceleration data perpendicular to a portion of the road; and a radio frequency (RF) transmitting device configured to communicate with the central backend;
 a memory arrangement comprising at least a first set of speed-based conversion equations associated with the first class of vehicles wherein each speed-based conversion equation in the first set relates to a different speed;
 a processor arrangement configured to: process the acceleration data measured by the measuring device into a value for a parameter, wherein the parameter is a statistical parameter obtained by processing the z-axis acceleration data statistically and wherein the statistical parameter is a Coefficient of Variation (CoV) which is defined as a ratio between the standard deviation ($\sigma$) and the mean ($\mu$) of the acceleration data received for the portion of the road; receive speed data of the first vehicle travelling along the portion of the road and to select a first speed-based conversion equation from the first set of speed-based conversion equations based on the speed data; utilize the first speed-based conversion equation to convert the parameter into an approximation of a roughness figure for the portion of the road; combine the approximation of the roughness figure for the portion of the road with respective approximations of the roughness figure for adjacent portions of the road, to generate the roughness profile for the road; and use the roughness profile to the road to at least one of: inform road maintenance service providers of areas in the road in need of maintenance, enable road transport service providers to select a route to minimize damage to vehicles or to select a different route, and assist road users with a visual representation of the roughness profile.

16. A system according to claim 15, wherein the measuring device is a vehicle telematics device.

17. A system according to claim 15, wherein the backend comprises the memory arrangement.

* * * * *